US006919417B2

(12) United States Patent
König et al.

(10) Patent No.: US 6,919,417 B2
(45) Date of Patent: Jul. 19, 2005

(54) ONE-COMPONENT POLYURETHANE STOVING COATING COMPOSITIONS AND THEIR USE

(75) Inventors: Eberhard König, Leverkusen (DE); Christoph Gürtler, Köln (DE); Frank Kobor, Beijing (CN); Wolfram Küttner, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/079,661

(22) Filed: Feb. 20, 2002

(65) Prior Publication Data

US 2003/0055158 A1 Mar. 20, 2003

(30) Foreign Application Priority Data

Feb. 26, 2001 (DE) .......................................... 101 09 228

(51) Int. Cl.[7] .............................................. C08G 18/80
(52) U.S. Cl. ........................................... 528/45; 528/56
(58) Field of Search ...................... 528/45, 56; 524/413

(56) References Cited

U.S. PATENT DOCUMENTS

| 4,373,081 | A | | 2/1983 | Nachtkamp et al. | ........... 528/45 |
| 4,562,237 | A | * | 12/1985 | Okuno et al. | .................. 528/17 |
| 4,727,099 | A | | 2/1988 | Vasta | ........................ 524/40 |
| 4,727,100 | A | | 2/1988 | Vasta | ........................ 524/40 |
| 5,688,890 | A | * | 11/1997 | Ishiguro et al. | ................ 528/51 |
| 6,060,573 | A | * | 5/2000 | Konig et al. | .................. 528/45 |
| 6,103,849 | A | * | 8/2000 | Squiller et al. | ................ 528/45 |

* cited by examiner

Primary Examiner—James J. Seidleck
Assistant Examiner—U. K. Rajguru
(74) Attorney, Agent, or Firm—Joseph C. Gil; Thomas W. Roy

(57) ABSTRACT

The present invention relates to aqueous- or solvent-based, one-component, polyurethane stoving coating compositions containing
i) polyisocyanates blocked with CH-acidic esters, especially malonic esters,
ii) OH-containing polymeric compounds, and
iii) 0.5 to 4.0 wt. %, based on the solids content of components i) and ii), of tetravalent titanium compounds.

The stoving coating compositions have a low stoving temperature and are useful for coating plastic parts.

5 Claims, No Drawings

ONE-COMPONENT POLYURETHANE STOVING COATING COMPOSITIONS AND THEIR USE

BACKGROUND OF THE INVENTION

1. Field of the Invention

The present invention relates to one-component polyurethane stoving coating compositions containing polyisocyanate crosslinking agents blocked with CH-acidic esters, especially malonic acid esters, and to their use for coating plastic parts.

2. Description of the Prior Art

The blocking of polyisocyanates with CH-acidic esters, especially malonic acid esters is known and described by the following publications: Petersen, Liebigs Ann. Chem. 562, (1949) 205, DE-A 30 010 60.

Using polyisocyanates blocked with malonic esters, and polymeric OH components (polyesters, polyacrylates, etc.), it is possible to prepare storage-stable "one-component coating compositions". After application, the coating compositions cure under stoving conditions of 30 minutes at 100° C. With other isocyanate-blocking agents, for example butanoneoxime, 1,2,4-triazole, diisopropylamine or 3,5-dimethylpyrazole, such a low stoving temperature is not achievable.

However, a low stoving temperature is necessary when thermoplastic plastics, for example motor vehicle parts such as bumpers, hub caps or trims, are to be coated. Recently, the challenge has been to coat polypropylene parts with a one-component coating composition, which requires stoving temperature of less than 100° C.

It is known to process one-component polyurethane stoving lacquers with the conventional blocking agents mentioned above with, for example, dibutyltin dilaurate (DBTL) catalysts (e.g. in Farbe&Lack 7/96, 102nd year, pages 51–58, Vincentz Verlag/Hanover).

Catalysis of one-component stoving lacquers containing polyisocyanates blocked with malonic esters was previously not known.

Accordingly, an object of the present invention is to cure one-component polyurethane stoving lacquers based on polyisocyanates blocked with CH-acidic esters at stoving temperatures of <100° C.

It has been possible to achieve that object using the one-component polyurethane stoving lacquers according to the invention, which contain titanium compounds as catalysts.

SUMMARY OF THE INVENTION

The present invention relates to aqueous- or solvent-based, one-component, polyurethane stoving coating compositions containing
i) polyisocyanates blocked with CH-acidic esters, especially malonic esters,
ii) OH-containing polymeric compounds, and
iii) 0.5 to 4.0 wt. %, based on the solids content of components i) and ii), of tetravalent titanium compounds.

DETAILED DESCRIPTION OF THE INVENTION

Fundamental to the invention is the presence of a tetravalent organic titanium compound as catalyst, which imparts to a one-component polyurethane coating composition mixture containing polyisocyanates blocked with CH-acidic esters and organic polyhydroxyl compounds sufficiently good crosslinking even at a stoving temperature of 90° C./30 minutes. A stoving temperature of 85° C./30 minutes is also achievable.

The titanium(IV) catalysts to be used according to the invention are mixed with the coating composition binder components, which are present in dissolved form. Those one-component polyurethane binders are stable to storage and can be formulated, for example, as finished products for the following coating applications: filler or primer, metal base coatings, clear coatings, pigmented finishing coatings and water-reducible soft feel coatings. They may optionally contain known additives, such as pigments and flow auxiliaries.

Suitable titanium(IV) catalysts to be used according to the invention include tetra-n-butyl orthotitanate, tetraethyl titanate, tetramethyl titanate, titanium tetra-(2-ethylhexanoate), titanium triisopropylate chloride, cyclopentadienyltitanium trichloride and mixtures thereof. Tetra-n-butyl titanate is preferred.

The titanium(IV) catalysts are used in amounts of 0.5 to 4.0 wt. %, preferably 1.5 to 2.5 wt. %, based on the solids content of binder components i) and ii).

The one-component polyurethane stoving lacquers according to the invention can be used for coating a variety of substrates, for example, metals, glass, minerals, ceramics, wood, paper and plastics (such as polycarbonate, polymethyl methacrylate, polyamides and polypropylene).

In the following examples the invention is illustrated by means of a catalyzed clear coating composition in comparison with other catalysts based on bismuth, tin and zirconium. It is shown that the complete curing of the non-catalyzed coating composition at 100° C. can be lowered by the use of tetrabutyl titanate to at least 90° C. and may even tend towards 85° C. The coating of polypropylene plastics parts with these one-component coating compositions would thus also appear achievable.

EXAMPLES

Starting Component

Example 1

Preparation and characterization of the components of the clear coating compositions a) Polyisocyanate crosslinking agent blocked with malonic esters

| Ingredients: | [g] | [gram equivalents] |
|---|---|---|
| Desmodur W, trimerized, 80% in butyl diglycol acetate (BDGA), NCO content found: 17.1%[1] | 246.0 | 1.0 |
| Diethyl malonate (DEM) | 160.0 | 1.0 |
| Na methoxide solution, 30% in MeOH | 3.5 | — |
| 3,5,5-Trimethyl-3-aminomethyl-cyclohexylamine (IPDA) | 8.5 | 0.1 |
| Paraformaldehyde (Pafo) | 3.0 | 0.1 |
| Tinuvin 770 DF[2] | 3.7 | — |

-continued

| Ingredients: | [g] | [gram equivalents] |
|---|---|---|
| Isobutanol (IB) | 78.9 | — |
| N-Methylpyrrolidone (NMP) | 78.9 | — |
| Dibutyl phosphate (DBP) | 11.0 | — |
| Blocked NCO groups | 593.5 | 1.0 |
| Solids, calc.: | approx. 65% | |
| Viscosity at 23° C.: | approx. 7000 mPas | |
| pH: | 6.3 | |
| clear solution, Hazen color value: | approx. 50 Apha | |
| 1 gram equivalent of blocked NCO groups: | 594.0 g | |

[1]Trimerization: Desmodur W was placed in a vessel and heated to 80° C., with stirring, while a fine stream of $N_2$ was passed through. The reaction was started by addition of 3–5 ml of a 5% benzyl trimethyl ammonium hydroxide solution (in n-butanol/NMP). Additional catalyst was added in each case as soon as the reaction temperature fell below 85–90° C. until the original NCO content of 32.06% fell to approximately 21.0%, corresponding to the conversion of 35% of the NCO groups present. The mixture was diluted with BDGA and allowed to cool. The pale-yellow-colored solution of trimerized Desmodur W had an NCO content of 17.1%, corresponding to an NCO equivalent weight of 246 g.
[2]from Ciba Specialty Chemicals Inc., CH-4002 Basle Implementation DEM and a 3.0 g portion of Na methoxide solution were placed in a vessel at 50° C. with stirring. The above-described Desmodur W trimerization product was added thereto in portions. After the addition, the temperature was raised to 70–75° C. and stirring was continued for approximately 5 hours until the NCO content had fallen to approximately 0.5%. The mixture was then diluted with NMP and the NCO groups that remain were reacted with IPDA.

The clear solution of Pafo, 0.3 g of Na methoxide solution and IB (half the amount) were added to the reaction solution, which was at a temperature of approximately 50° C., and stirring was carried out for 2 hours at 50° C.

The solution of Tinuvin 770 DF, DBP and IB (remainder) was then added, and stirring was carried out for approximately 2 hours at 50° C.

A storage-stable solution of a polyisocyanate blocked with malonic esters was obtained which had the properties previously mentioned.

b) The reactant used for the above crosslinking agent blocked with malonic esters was an OH-containing polyacrylate (Desmophen A 665, available from Bayer AG, 3% OH content, OH equivalent of the solution—567 g, 65% in butyl acetate/xylene 3:1).

Example 2 (According to the Invention)

Preparation of a clear coating composition and curing under the influence of various catalysts a) Composition of the clear coating

| composition | [parts by weight] |
|---|---|
| Crosslinking agent according to Example 1a | 32.7 (0.055 gram equivalents of blocked NCO) |
| Desmophen A 665 (see 1b) | 31.2 (0.055 gram equivalents of OH) |
| Baysilone OL 17, 10% in xylene[1] | 0.4 |
| Tinuvin 1130, 10% in xylene[2] | 4.1 |
| Tinuvin 292, 10% in xylene[2] | 4.1 |
| Butyl acetate, 1-methoxy-2-propyl acetate (MPA) | 27.5 |
| Clear coating composition | 100.0 |

[1]obtainable from Bayer AG, 51368 Leverkusen
[2]obtainable from Ciba Specialty Chemicals Inc., CH-4002 Basle For the purposes of the further testing, the clear coating composition was mixed with the catalyst in an amount of 1% and 2%, based on the solids content of the binder, i.e, 0.41 g and 0.82 g, respectively, per 100 g of clear coating composition. 120 μm wet films were produced by means of a doctor blade and stoved in an oven under the following conditions.

Example 3 (According to the Invention)

Coating of a motor vehicle mirror casing.

An uncoated mirror casing from Audi (material ABS) was cleaned using commercially available washing solutions and then rinsed with demineralized water and dried. The coating compositions listed below were applied by means of spray application using a spray gun from Sata. The nozzle diameter was 1.4 mm and a spray pressure of 2.5 bar was used.

1. Filler Application

A commercially available two-component polyurethane filler from Du Pont (Wuppertal) was applied uniformly in a film thickness of 30 to 40 μm and was then dried for 30 minutes at 80° C.

2. Base Coat Composition Application

A color- and effect-providing coating composition (metallic base coat, silver, also from Du Pont) was then applied in a film thickness of 12 to 15 μm and was dried for 5 minutes at 80° C.

3. Clear Coating Composition Application

As the third and final coating, a clear coating composition, as described in Example 2, having the following composition was applied:

|  | Parts by weight |
|---|---|
| Crosslinking agent according to Example 1a | 32.7 |
| Desmophen A 665 (see Example 1b) | 31.2 |
| Baysilone OL 17, 10% in xylene | 0.4 |
| Tinuvin 1130, 10% in xylene | 4.1 |
| Tinuvin 292, 10% in xylene | 4.1 |
| Butyl acetate/MPA 1:1 | 26.7 |
| Tetra-n-butyl orthotitanate | 0.8 |
|  | 100.0 |

The clear coating composition was applied in a film thickness of from 40 to 50 μm and then dried for 30 minutes at 80° C. Clear, high-gloss film surfaces with good curing and good coating properties were obtained.

b) Catalyst screening

The curing of the clear coating compositions was tested by means of pendulum hardness (DIN 53 157) and solvent resistance (which was conducted in accordance with automotive industry standards). In that method, drops of various solvents were applied in succession to the coating using cotton wool. After being allowed to act for 1 minute, the solvent was wiped off and the film was evaluated. A rating of 0 means that the coating was not damaged. In the case of the poorest score of 5, the film became detached from the substrate. Yellowing of the film was measured by means of the CieLab method. b values of approximately 1.0 were regarded as being still acceptable. Δb values arise when an already stoved coating composition film was over-stoved, and they must not exceed 1.0.

8 clear coating compositions were tested with the following catalysts:
1. no catalyst
2. bismuth (2-ethylhexanoate)$_3$ from King Industries
3. tetra-n-butyl orthotitanate (TBT)
4. dibutyltin dilaurate (DBTL)
5. Zr (2-ethylhexanoate)$_4$
6. Ti (2-ethylhexanoate)$_4$
7. Ti triisopropylate chloride
8. cyclopentadienyltitanium trichloride As shown in the following table, tetrabutyl titanate (TBT) was the only one of the tested catalysts to begin to act even during the 80° C./30 minutes curing. With the use of 2% TBT, both the film hardness and the solvent resistance were better than the zero value. That trend becomes marked in the case of the 90° C./30 minutes curing. The solvent resistance, with a rating of 0025 with good hardness of the coating of 188 s, indicates usably good crosslinking, which was not achieved either with the zero value or with the films catalyzed with other catalysts. Furthermore, the 90° C./30 minutes curing shows that the tetravalent titanium catalysts have an advantage over the other catalysts.

The relatively high yellowing values for titanium(IV) catalysts under over-stoving conditions at 160° C./30 minutes with Δb=2.5–3.1 must be qualified to the effect that plastics do not withstand that temperature without deformation.

Catalyst study for the clear coatings

| Catalyst type / Catalyst amount | 1. without | 2. (comparison) K-Kat 348[1] bismuth (2-ethylhexanoate)₃ | | 3. (acc. to inv.) Tetra-n-butyl orthotitanate (TBT) | | 4. (comparison) Dibutyltin dilurate (DBTL) | | 5. (comparison) Zirconium 2-ethylhexanoate₄ | | 6. (comparison) Ti (2-ethylhexanoate)₄ | | 7. Ti triisopropylate chloride | | 8. Cyclopentadienyl titanium trichloride | |
|---|---|---|---|---|---|---|---|---|---|---|---|---|---|---|---|
| (calculated solid on solid) | out | 1% | 2% | 1% | 2% | 1% | 2% | 1% | 2% | 1% | 2% | 1% | 2% | 1% | 2% |
| DRYING | | | | | | | | | | | | | | | |
| 30 min./80° C. | | | | | | | | | | | | | | | |
| Pendulum hardness (s.) | 99 | 71 | 32 | 101 | 144 | 87 | 110 | 92 | 108 | 113 | 97 | 92 | 78 | 95 | 104 |
| Solvent resistance | | | | | | | | | | | | | | | |
| Duration of action 1 min. | | | | | | | | | | | | | | | |
| Xylene/MPA/ethyl acetate/acetone | 5555 | 5555 | 4455 | 5555 | 4455 | 5555 | 5555 | 5555 | 5555 | 5555 | 5555 | 5555 | 5555 | 5555 | 5555 |
| 0 = good, 5 = poor | | | | | | | | | | | | | | | |
| Yellowing (b value) | 0.6 | 0.6 | 0.6 | 0.6 | 0.6 | 0.6 | 0.6 | 0.7 | 0.6 | 0.9 | 1.0 | 1.3 | 2.2 | 1.4 | 3.0 |
| DRYING | | | | | | | | | | | | | | | |
| 30 min./90° C. | | | | | | | | | | | | | | | |
| Pendulum hardness (s.) | 195 | 150 | 90 | 161 | 188 | 160 | 171 | 153 | 193 | 199 | 179 | 192 | 174 | 186 | 192 |
| Solvent resistance | | | | | | | | | | | | | | | |
| Duration of action 1 min. | | | | | | | | | | | | | | | |
| Xylene/MPA/ethyl acetate/acetone | 3355 | 2255 | 2245 | 3345 | 0025 | 3455 | 2345 | 2345 | 2345 | 2345 | 1245 | 2345 | 1245 | 3355 | 2345 |
| 0 = good, 5 = poor | | | | | | | | | | | | | | | |
| Yellowing (b value) | 0.6 | 0.6 | 0.6 | 0.6 | 0.6 | 0.6 | 0.6 | 0.6 | 0.6 | 1.0 | 1.0 | 1.4 | 2.5 | 1.7 | 3.3 |
| DRYING | | | | | | | | | | | | | | | |
| 30 min. 100° C. | | | | | | | | | | | | | | | |
| Pendulum hardness (s.) | 206 | 188 | 147 | 195 | 202 | 180 | 192 | 211 | 214 | 211 | 202 | 211 | 203 | 188 | 211 |
| Solvent resistance | | | | | | | | | | | | | | | |
| Duration of action 1 min. | | | | | | | | | | | | | | | |
| Xylene/MPA/ethyl acetate/acetone | 0014 | 0025 | 0024 | 0024 | 0002 | 0124 | 0013 | 0012 | 0012 | 0012 | 0002 | 0002 | 0012 | 0013 | 0012 |
| 0 = good, 5 = poor | | | | | | | | | | | | | | | |
| Yellowing (b value) | 0.6 | 0.6 | 0.6 | 1.1 | 1.8 | 0.6 | 0.6 | 0.6 | 0.7 | 1.0 | 1.1 | 1.5 | 2.9 | 1.9 | 3.1 |
| Yellowing 30 min. 100° C. + 30 min. 160° C. (Δb value) | 0.1 | 0.1 | 0.1 | 2.5 | 3.1 | 0.2 | 0.3 | 0.4 | 0.2 | 1.3 | 2.4 | 2.2 | 3.7 | 1.2 | 1.8 |

[1] King Industries Specialty Chemicals, Kattensingel 7, 2801 Gouda, Holland

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. An aqueous- or solvent-based, one-component, polyurethane stoving coating composition comprising
   i) a polyisocyanate blocked with a CH-acidic ester,
   ii) OH-containing polymeric compound, and
   iii) 0.5 to 4.0 wt. %, based on the solids content of components i) and ii), of a tetravalent titanium compound.

2. The stoving coating composition of claim 1 wherein component i) comprises a polyisocyanate blocked with a malonic ester.

3. The stoving coating composition of claim 1 wherein the tetravalent titanium compound comprises tetra-n-butyl titanate.

4. The stoving coating composition of claim 2 wherein the tetravalent titanium compound comprises tetra-n-butyl titanate.

5. A plastic, metal, wood, paper, ceramic, mineral or glass substrate coated with the stoving coating composition of claim 1.

* * * * *